June 28, 1938.    S. M. NAMPA    2,121,922
HAND OPERATED TRUCK BODY
Filed Nov. 19, 1936    2 Sheets-Sheet 1
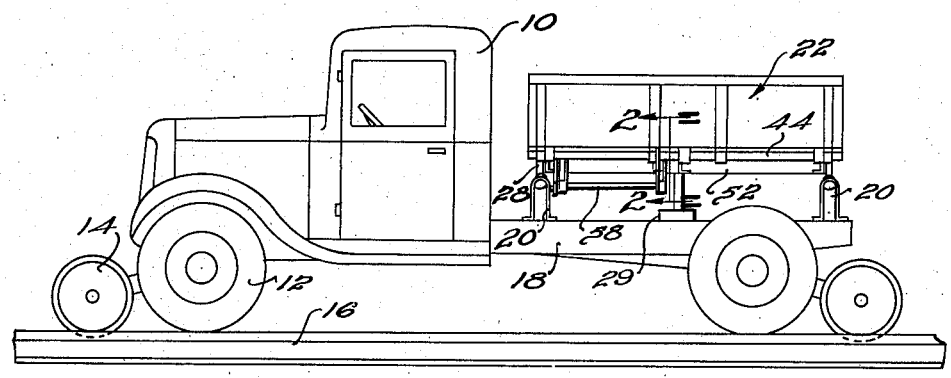
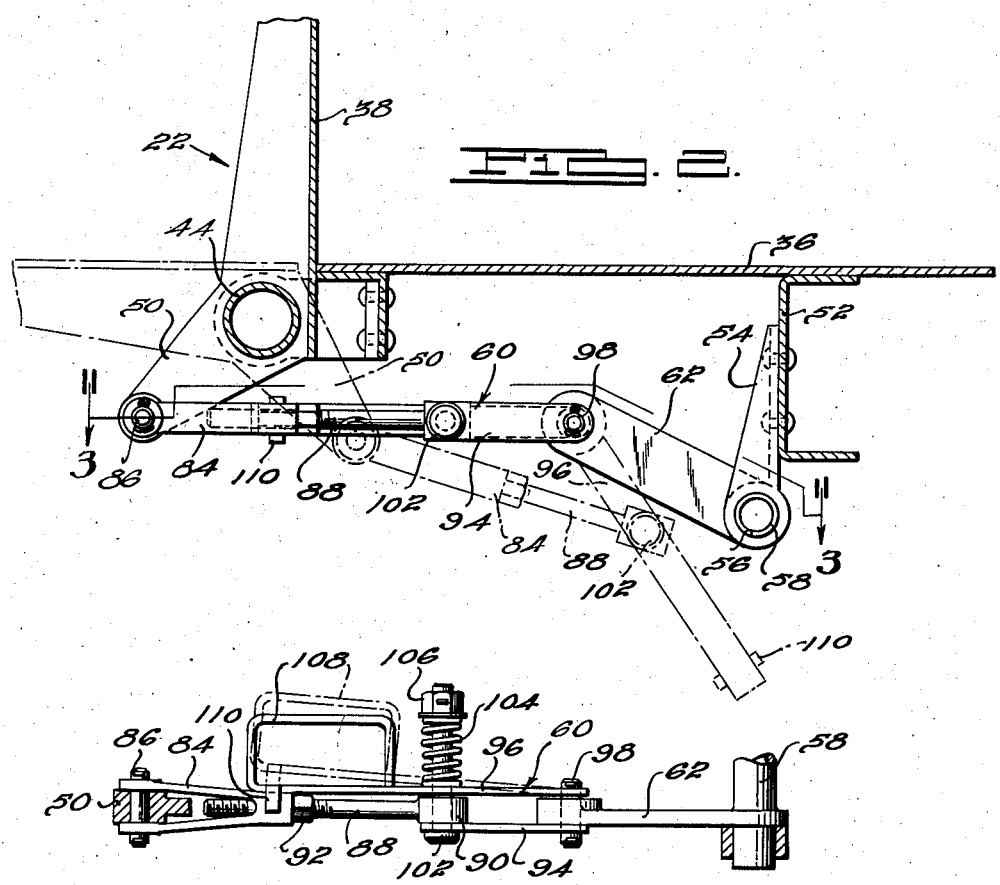
INVENTOR.
Sulo M. Nampa.
BY
Harness, Dickey Pierce & Hann
ATTORNEYS.

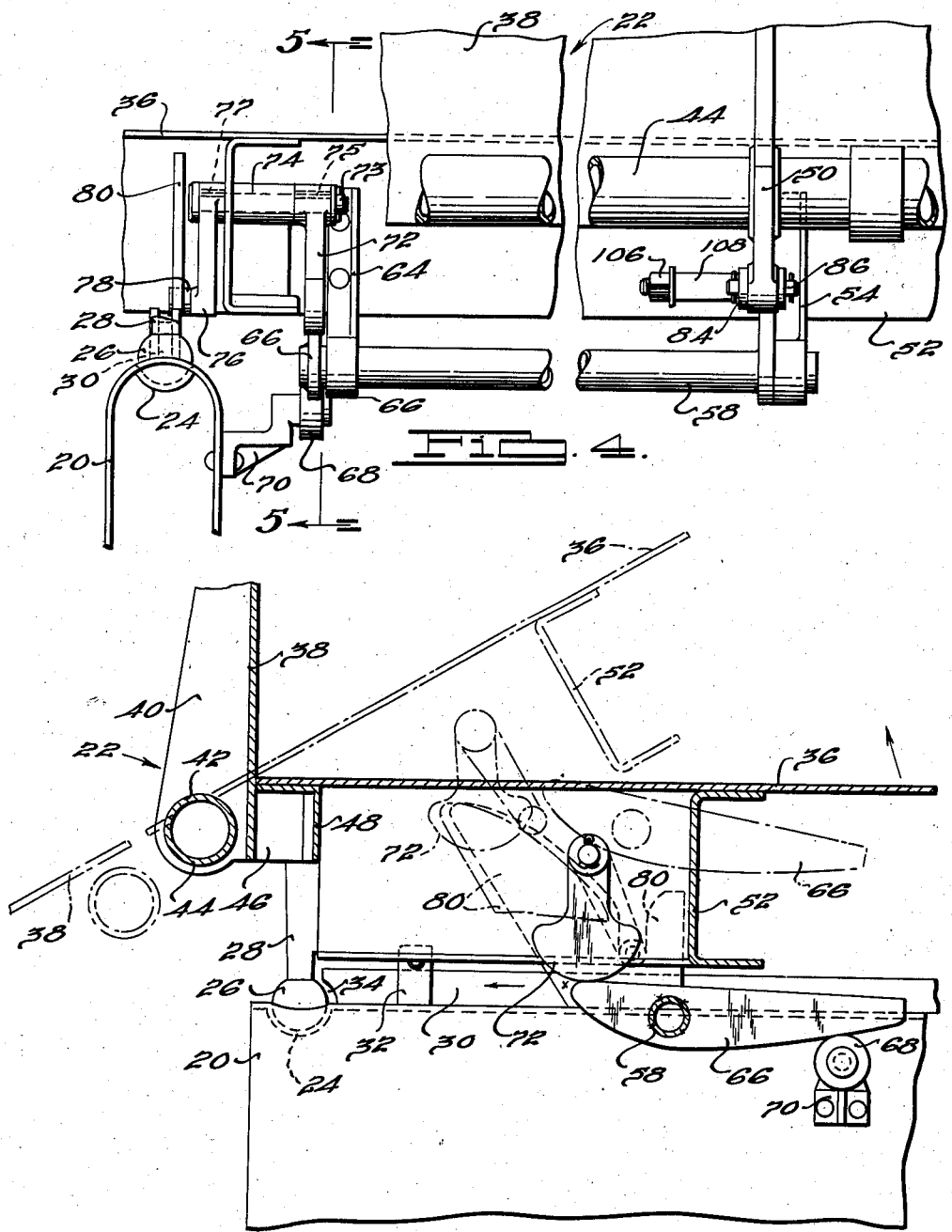

Patented June 28, 1938

2,121,922

UNITED STATES PATENT OFFICE 2,121,922

HAND OPERATED TRUCK BODY

Sulo M. Nampa, Detroit, Mich., assignor to Transportation Systems, Inc., Tulsa, Okla., a corporation of Oklahoma Application November 19, 1936, Serial No. 111,564

4 Claims. (Cl. 298—18)

This invention relates to vehicle truck body constructions and in particular relates to structures for truck bodies in which the sides may be lowered to a position flush with the floor.

Objects of the invention are to provide a structure whereby the range of usefulness of a dump truck body having drop sides is increased; to provide a structure whereby a truck body having upstanding sides may be readily converted into a flat truck; to provide a structure by which the sides of a side dump truck body may be lowered to a horizontal position flush with the floor while the floor is retained in a horizontal position; and to provide a simple and economical structure which may be readily installed on known side dump trucks with a minimum of alteration to the dumping mechanism of the truck.

Other objects of the invention will become apparent from the following specification, the drawings relating thereto, and from the claims hereinafter set forth.

In the drawings in which like numerals are used to designate like parts in the several views throughout;

Figure 1 is a side elevational view of a side dump truck embodying features of the present invention;

Fig. 2 is a fragmentary, cross-sectional view, showing parts in elevation, taken substantially along the line 2—2 of Fig. 1;

Fig. 3 is a plan view taken substantially along the line 3—3 of Fig. 2;

Fig. 4 is a fragmentary, side-elevational view, with parts broken away, illustrating a preferred form of operating mechanism; and Fig. 5 is a cross-sectional view taken substantially along the line 5—5 of Fig. 4.

Conventional side dump bodies are made with sides which are held in the upright position when the body is being loaded, and the sides do not drop or lower until the bodies are inclined for discharging their contents, when the weight of the material to be discharged will cause the lowermost side to drop to a position in line and flush with the floor of the body. When the bodies have been emptied and are brought to their horizontal or loading position, the sides are automatically brought back to a perpendicular or upright position ready for the next loading. In such conventional constructions, each side of the body is provided with the same kind of mechanism for automatically causing the lowermost side to drop when the body is tilted towards that side for unloading. The sides can only be dropped or lowered to a position flush with the floor when the body, with the floor, is tilted and then only the lowermost side is lowered. In the constructions mentioned, when the body with the floor is in a horizontal position, the sides are upright and cannot, while in that position, be lowered to a position in line and substantially flush with the horizontal floor.

The present invention contemplates a structure by which the sides of the dump truck may be lowered to a position substantially flush with the floor while the floor is in its horizontal position. The mechanism of the present invention permits of either one or both of the sides being lowered to a horizontal position flush with the floor of the body while the body is in its horizontal loading position.

By the structure of the present invention, the range of usefulness of such truck bodies having drop sides is increased in that with the sides in a horizontal position flush with the floor, articles which are longer than the normal width of the body between the sides when they are in an upright position may be carried on the truck. The structure of the present invention has further advantages, one of them being, for example, more ready loading and unloading, in that with the sides in the horizontal position, no matter what type of article is to be carried, the lift necessary for the loading or unloading is materially decreased to an extent of the height of the sides.

Referring in detail to the drawings for a better understanding of the invention a vehicle truck 10 having rubber tired wheels 12 which are adapted to run on a road surface and having flanged wheels 14 which are adapted to be lowered into engagement with track 16 when the vehicle is run on rails is illustrated in Fig. 1. Although the present invention is illustrated on a vehicle truck of the type adapted to run on both road and rails, it is to be understood that the present invention is not limited to trucks of this particular type but that the invention has general utility and that the showing of the particular type of truck in Fig. 1 is merely for the purpose of illustration. The particular structure for raising and lowering the rail wheels 14 is not illustrated in detail in the present application as such detailed structure does not form a part of the present invention and is not necessary for an understanding of the present invention.

The truck 10 is provided with an underframe 18 having transversely extending, upstanding brackets 20 at the front and rear of the underframe to form corner supports for a dump truck body 22. The brackets 20 are provided with socket portions 24 at each side adjacent the upper ends thereof and opening upwardly, which are adapted to receive balls 26 rigidly secured by upstanding arms 28 to the dump truck body 22 adjacent each corner thereof.

Means, of any suitable construction, are provided for tilting the dump truck body 22 to either side, the ball and socket connection 26 and 24 permitting such tilting movement between the dump truck body and the underframe 18. The tilting means may, for example, be in the form of a hydraulic means 29 mounted on the underframe 18 having a ram engaging the underside of the dump truck body 22 substantially at its center.

In order to insure tilting of the dump body on one side only upon operation of the tilting means, transversely extending plate members 30 are slidably mounted within brackets 32, the brackets 32 being suitably secured to the underframe 18, the plate members extending between the front and rear pairs of the ball and socket connections respectively.

Suitable operating connections, preferably within the truck cab, are provided for the sliding plates 30 so that they may be moved transversely into engagement with the balls 26 at that side of the dump truck body about which the body is to be tilted. The plates 30 are provided with curved ends 34 complementary in shape to the outer surface of the ball 26; and it can be seen from an inspection of Fig. 5 that when the member 30 is moved to the left, for example, the curved portion 34 engages the outer surface of the ball 26 and holds it within its socket. The other end of the member 30 is at the same time moved away from its corresponding ball permitting that ball to be moved out of its socket. It is evident that by shifting the rod 30 to engagement with the ball 26 at the side desired that the dump truck body 22 may be tilted about that particular side.

The dump truck body 22 when in its horizontal loading position comprises a substantially horizontal floor portion 36 having end portions and having upstanding sides 38 forming upstanding confining walls. Each side 38 of the dump truck body is operatively associated with the floor portion 36 in the same manner, and a detailed description of one side and its operative connection will be sufficient for both.

The side 38 is pivotally mounted relative to the floor 36 by means of outwardly directed flanges 40 at spaced intervals along the side 38 having openings 42 and adjacent the lower end thereof which rotatably receive therethrough a tubular member 44 extending longitudinally of the truck body and suitably mounted to the underside of the floor 36 by means of brackets 46 secured, preferably, to an angle member 48 attached to the underside of the floor 36.

Upon tilting of the body 22 to one side, the weight of the material contained within the body against the side 38 on the side being tilted tends to rotate the side 38 about the tubular member 44 and thus lower or drop the side 38 to discharge the contents of the truck body; and means are provided to maintain the side 38 in its upright position relative to the floor until the body 22 approaches the end of its tilting movement when the side 38 is automatically released for lowering or dropping to discharge the body contents. This mechanism will now be described.

The side 38 is provided with a downwardly and outwardly extending arm 50 adjacent the lower end thereof, the arm 50 being provided with an opening therethrough adjacent its outer end. A supporting means, preferably in the form of a channel member 52 is secured to the underside of the floor 36 extending longitudinally thereof and spaced inwardly from the edge thereof. A bracket member 54 having an opening 56 therethrough at its lower end is suitably secured to the member 52, and a tubular member 58 is rotatably received within the opening 56 and is supported by the bracket 54. The arm 50 and tubular member 58 are interconnected by means of a linkage mechanism including a link member 60 and a link member 62. The member 60 is pivotally secured at its outer end to the arm 50 and is pivotally secured at its inner end to the member 62 which in turn is fixedly secured at its inner end to the shaft 58 for rotation therewith. A detailed description of the link 60 will be given hereinafter, it merely being necessary for an understanding of the automatic stopping operation now being described to indicate that the link 60 for this automatic operation forms a rigid connection between the link 62 and the arm 50.

The tubular member 58 is rotatably supported within a bracket member 64 at its outer end, the bracket member 64 being substantially the same in construction as the bracket member 54. The end portion of the tubular member 58 extends through the bracket 64 and is fixedly secured, as by spot welding, to an elongated member 66. The tubular member 58 is secured to the member 66 forwardly of the center of the member 66 so that when the member 66 is free to rotate, it rotates in a clockwise direction. When in the position shown in the full lines in Fig. 5, the member 66 is prevented from rotation by means of a stop roller 68 which engages the under surface of the member 66 and is mounted to the member 20 by means of a bracket 70. Also preventing rotation of the member 66, is a curved cam member 72 engaging the upper surface of the member 66 adjacent the outer edge thereof.

The member 72 is mounted to the under surface of the floor 36 for movement therewith by means of a bracket 74 suitably secured to the floor 36. The upper end of the member 72 is suitably secured through the bracket 74 to a downwardly extending arm 76 having a roller 78 secured to the lower end thereof. The connection between the member 72 and arm 76 is of such a nature that upon movement of the arm 76 the member 72 moves therewith and preferably comprises a pin 73 rotatably supported within the bracket 74 and keyed to the member 72 and arm 76 by means of suitable keys 75 and 77 respectively. The roller 78 is adapted to be guided by a cam member 80 secured to the member 30 by spot welding. As shown by the dotted and broken lines in Fig. 5, the cam member 80 shifts with the member 30 and the roller 78 follows the upper surface of the cam member 80 when the truck body 22 is tilted.

The operation of the mechanism above described, which releases the side 38 when the body 22 approaches the end of its tilting movement, is as follows: The shaft 58 cannot rotate while the member 66 is in engagement with both or either of the members 68 and 72, and the linkage mechanism formed by the members 60 and 62 between the shaft 58 and the arm 50 maintains the side 38 in its upright position relative to the floor 36. As the body 22 is tilted, the member 66 and the member 72 move upwardly with the body, the member 66 moving away from engagement with the roller 68 but still engaging the member 72. As the body 22 approaches its outermost tilting position, the member 72 is permitted to move to such a position by engagement of the roller 78 with the cam member 80 that engagement between the members 72 and 66 is broken and the member 66 is then free to rotate. The weight of the material against the side 38 will cause the side 38 to drop to a position flush with the floor and the linkage members 60 and 62 are thereby pivoted relative to each other, the linkage member 62 rotating with the shaft 58 in a clockwise direction. The relative positions of the members are shown in broken lines in Fig. 5 for the dumping. As the truck body is being lowered after dumping, the member 66 strikes against the roller 68 and the continued lowering of the body causes the shaft 58 to rotate in a counter-clockwise direction thus automatically raising the side 38 through the linkage members 60 and 62.

In order to provide a structure whereby the range of usefulness of the dump truck described is increased, the link 60, according to the present invention, is so constructed that it provides either a rigid connection between the arm 50 and the link member 62 or a collapsible connection which may be manually operated to lower or drop the sides 38 to a position substantially in line and flush with the floor 36 when the floor 36 is in a horizontal position. Although the link 60 is illustrated with one particular type of automatic dump truck, it is to be understood that the collapsible link of the present invention is adapted to be applied to other types of dump trucks in which the sides are supported by linkage mechanisms.

According to the present invention, the link member 60 comprises an adjustable yoke member 84, the outer ends of which embrace the lower end of the arm 50 and have openings therethrough in line with the opening in the member 50 and which is pivotally secured to the member 50 by a pin 86. The inner end of the yoke member 84 is provided with a threaded opening therethrough which is adapted to receive an elongated member 88, the member 88 being threaded at one end and being provided with an enlarged portion 90 having an opening therethrough at the other end. The member 88 may be fixed relative to the member 84 by means of a suitable lock nut 92.

To provide the connection between the member 88 and the linkage member 62, a plate member 94, having openings therethrough at its ends, and an elongated member 96, having an opening therethrough at one end and an opening therethrough in line with the opening through the portion 90, or mounted on opposite sides of the members 88 and 62. The members 94 and 96 are pivotally mounted relative to the linkage member 62 by means of a pivot pin 98 and are mounted relative to the member 80 by means of an elongated pivot pin 102 extending through the openings in the members 94, 88, and 96 respectively, and being provided with a spring member 104 preferably held in position on the pivot pin 102 by means of a nut 106 threaded on the outer end of the pivot pin.

The elongated member 96 is provided with a handle 108 have a U-shaped pronged member 110 secured thereto, the prongs of which embrace the inner portion of the yoke member 84. The surfaces of the yoke member engaged by the prongs are preferably flattened to provide adequate engaging surfaces for the prongs.

The spring 104 tends to maintain the prong member 110 in engagement with the yoke 84, and when the member 96 is in this locked position, a rigid link connection is provided between the arm 50 and the link member 62. The handle 108 may be pulled outwardly to disengage the member 110 from the yoke against the action of the spring 104 and a collapsible link is thus formed between the arm 50 and the link member 62 in which the member 88 may be pivoted relative to the members 94 and 96. By thus disengaging the member 96 and pressing downwardly on the handle 108, the link mechanism 60 is moved to a position shown in the broken lines in Fig. 2 and the side 38 is dropped or lowered to the position shown in the broken lines of Fig. 2. From this manual operation, it can thus be seen that the side 38 may be lowered to a position substantially in line and flush with the floor 36 while the floor 36 is maintained in a substantially horizontal position. When the sides are in this position, articles substantially longer than the width of the truck body when the sides are in an upright position may be carried by the truck, and it can also be seen that the truck may be more conveniently loaded and unloaded as the lift required is substantially reduced.

Although the operation of one side only of the truck body has been described in detail, it is to be understood that the other side is constructed in a similar manner and that either both of the sides may be lowered at the same time or one side only.

Formal changes may be made in the specific embodiment of the invention described without departing from the substance of the broad invention, the scope of which is commensurate with the appended claims.

What I claim is:

1. A vehicle truck body comprising a floor and upstanding confining walls, means supporting said floor in a substantially horizontal position, means pivotally supporting said walls relative to said floor, and linkage means connecting said walls and said floor, said linkage means including a first member connected to said floor, a second member connected to one of said walls, an elongated member pivotally connected to said first member and pivotally connected to said second member and having means releasably engaging one of said first and second named members to provide a rigid connection between said first and second named members, and means to release said elongated means from engagement with said one of said first and second named members, the construction and arrangement being such that upon said release said linkage means is rendered collapsible for moving said walls about said pivotal means to a position substantially flush with said floor while said floor is retained in its substantially horizontal position.

2. An improved dump truck construction comprising an underframe, a body mounted to tilt about either side of said underframe, means to tilt said body about either side of said underframe, sides pivotally mounted adjacent the floor of said body, linkage means connecting said sides and said floor, said linkage means including a first member connected to said floor, a second member connected to one of said sides, an elongated member pivotally connected to said first member and pivotally connected to said second member and having means releasably engaging one of said first and second named members to provide a rigid connection between said first and second named members, and means to release said elongated means from engagement with said one of said first and second named members to provide a collapsible link, the construction and arrangement being such that when said members are in engagement providing a rigid connection said tilting means may be operated to tilt said body about one of said sides to automatically lower said side and that when said members are dis-engaged to provide a collapsible link said sides may be moved to a position substantially flush with said floor while said floor is retained in a substantially horizontal position.

3. A vehicle truck body comprising a floor and upstanding confining walls, means supporting said floor in a substantially horizontal position, means pivotally supporting said walls relative to said floor, and linkage means connecting said walls and said floor, said linkage means including a first member connected to said floor, a second member connected to one of said walls, an elongated member pivotally connected to said first member adjacent one end of said elongated member and pivotally connected to said second member intermediate the length of said elongated member, the free end of said elongated member having means releasably engaging said second member to provide a rigid connection between said first and second named members, and means to release said elongated means from engagement with said second named member, the construction and arrangement being such that upon said release said linkage means is rendered collapsible for moving said walls about said pivotal means to a position substantially flush with said floor while said floor is retained in its substantially horizontal position.

4. A vehicle truck body comprising a floor and upstanding confining walls, means supporting said floor in a substantially horizontal position, means pivotally supporting said walls relative to said floor, and linkage means connecting said walls and said floor, said linkage means including a first member connected to said floor, a second member connected to one of said walls, an elongated member pivotally connected to said first member adjacent one of the ends of said elongated member and pivotally connected to said second member intermediate the length of said elongated member, the free end of said elongated member having means releasably engaging said second named member to provide a rigid connection between said first and second named members, resilient means holding said elongated member in releasable engagement with said second named member and means to release said elongated means from engagement with said second named member, the construction and arrangement being such that upon said release said linkage means is rendered collapsible for moving said walls about said pivotal means to a position substantially flush with said floor while said floor is retained in its substantially horizontal position.

SULO M. NAMPA.